(12) United States Patent
Ohara et al.

(10) Patent No.: US 10,664,033 B2
(45) Date of Patent: May 26, 2020

(54) POWER SUPPLY CIRCUIT

(71) Applicant: HITACHI AUTOMOTIVE SYSTEMS, LTD., Hitachinaka-shi, Ibaraki (JP)

(72) Inventors: Yuri Ohara, Hitachinaka (JP); Atsushi Arata, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/340,342

(22) PCT Filed: Sep. 26, 2017

(86) PCT No.: PCT/JP2017/034630
§ 371 (c)(1),
(2) Date: Apr. 8, 2019

(87) PCT Pub. No.: WO2018/096776
PCT Pub. Date: May 31, 2018

(65) Prior Publication Data
US 2020/0042060 A1 Feb. 6, 2020

(30) Foreign Application Priority Data
Nov. 25, 2016 (JP) ................................. 2016-229234

(51) Int. Cl.
*G06F 1/26* (2006.01)
*G06F 1/28* (2006.01)
*G06F 1/30* (2006.01)
*G05F 1/00* (2006.01)

(52) U.S. Cl.
CPC .................. *G06F 1/28* (2013.01); *G05F 1/00* (2013.01); *G06F 1/263* (2013.01); *G06F 1/30* (2013.01)

(58) Field of Classification Search
CPC ... G05F 1/00; G06F 1/26; G06F 1/263; G06F 1/266; G06F 1/28; G06F 1/30; G06F 1/305
USPC ................ 327/518, 519, 520, 530, 538, 540
See application file for complete search history.

(56) References Cited

U.S. PATENT DOCUMENTS 9,819,223 B2 * 11/2017 Jeon ......................... H02J 9/061
2009/0315397 A1 12/2009 Udo

FOREIGN PATENT DOCUMENTS

| JP | S54-124238 A | 9/1979 |
|----|----|----|
| JP | H03-083445 U | 8/1991 |
| JP | H04-289725 A | 10/1992 |
| JP | 2001-184142 A | 7/2001 |
| JP | 2005-253124 A | 9/2005 |
| JP | 2008-206223 A | 9/2008 |
| JP | 2013-182603 A | 9/2013 |

OTHER PUBLICATIONS

International Search Report dated Dec. 26, 2017 for the International Application No. PCT/JP2017/034630.

* cited by examiner

*Primary Examiner* — William Hernandez
(74) *Attorney, Agent, or Firm* — Volpe and Koenig, P.C.

(57) ABSTRACT

In a power supply circuit in which a power supply sequence is variable, a malfunction of a device to which power is supplied caused by a wrong power-on order is prevented. In a power supply circuit according to the present invention, an operation state of a previous voltage regulator is detected, and based on a detection result, an order of activation or stop of respective voltage regulators is controlled.

10 Claims, 9 Drawing Sheets

POWER SUPPLY CIRCUIT

TECHNICAL FIELD

The present invention relates to a power supply circuit including a plurality of voltage regulators.

BACKGROUND ART

A microcomputer controlling an electronic device requires power inputs by means of a plurality of different voltage levels depending on the type thereof, and the power-on order is set per type. In a case in which the power supplies are turned on in a different order from the predetermined power-on order, the microcomputer may malfunction.

In a power integrated circuit (IC) serving as a semiconductor integrated circuit generating power to be supplied to a microcomputer, the activation order of voltage regulators is set in a development stage so as to correspond to a microcomputer to be built in an applicable device. For this reason, the power IC cannot be applied to a microcomputer having a different power-on order. Therefore, it is difficult to use the power IC for a different device. Also, in a case in which the microcomputer to be built in the applicable device is changed, a new power IC needs to be designed.

As a conventional technique for dealing with this problem, there is a countermeasure in which timing of transmitting activation signals of respective voltage regulators is controlled to enable an activation order to be varied. For example, PTL 1 shown below discloses the following technique (refer to the abstract). "A sequence circuit controls activation timing of power supply circuits 1 to 4 based on count setting values CONT1 to CONT4 of the power supply circuits 1 to 4 from a selection circuit. A timing setting circuit outputs predetermined count setting values C81 to C84. An interface circuit reads out predetermined activation control data stored in an external storage device and outputs the data as count setting values C91 to C94. The selection circuit responds to a selection signal SEL to output the count setting values C81 to C84 or the count setting values C91 to C94 as the count setting values CONT1 to CONT4 to the sequence circuit."

CITATION LIST

Patent Literature

PTL 1: JP 2013-182603 A

SUMMARY OF INVENTION

Technical Problem

In the power supply circuit in which activation timing of the voltage regulators is varied by time setting as described in PTL 1, even in a case in which the voltage regulator is not activated due to a delay of a voltage rise caused by a change of a load condition of an external circuit, a failure of the voltage regulator, or the like, the subsequent voltage regulator is activated irrelevantly to the reasons when the setting time passes. Hence, in this case, the power-on order for the microcomputer is wrong, which may cause a malfunction.

The present invention is accomplished by taking such problems as mentioned above into consideration thereof, and an object thereof is to prevent a malfunction of a device to which power is supplied caused by a wrong power-on order in a power supply circuit in which a power supply sequence is variable.

Solution to Problem

In a power supply circuit according to the present invention, an operation state of a previous voltage regulator is detected, and based on a detection result, an order of activation or stop of respective voltage regulators is controlled.

Advantageous Effects of Invention

With a power supply circuit according to the present invention, a malfunction of a device to which power is supplied caused by a wrong power-on order can be prevented in a power supply circuit in which a power supply sequence is variable.

DESCRIPTION OF EMBODIMENTS

Embodiment 1

Figure 1:
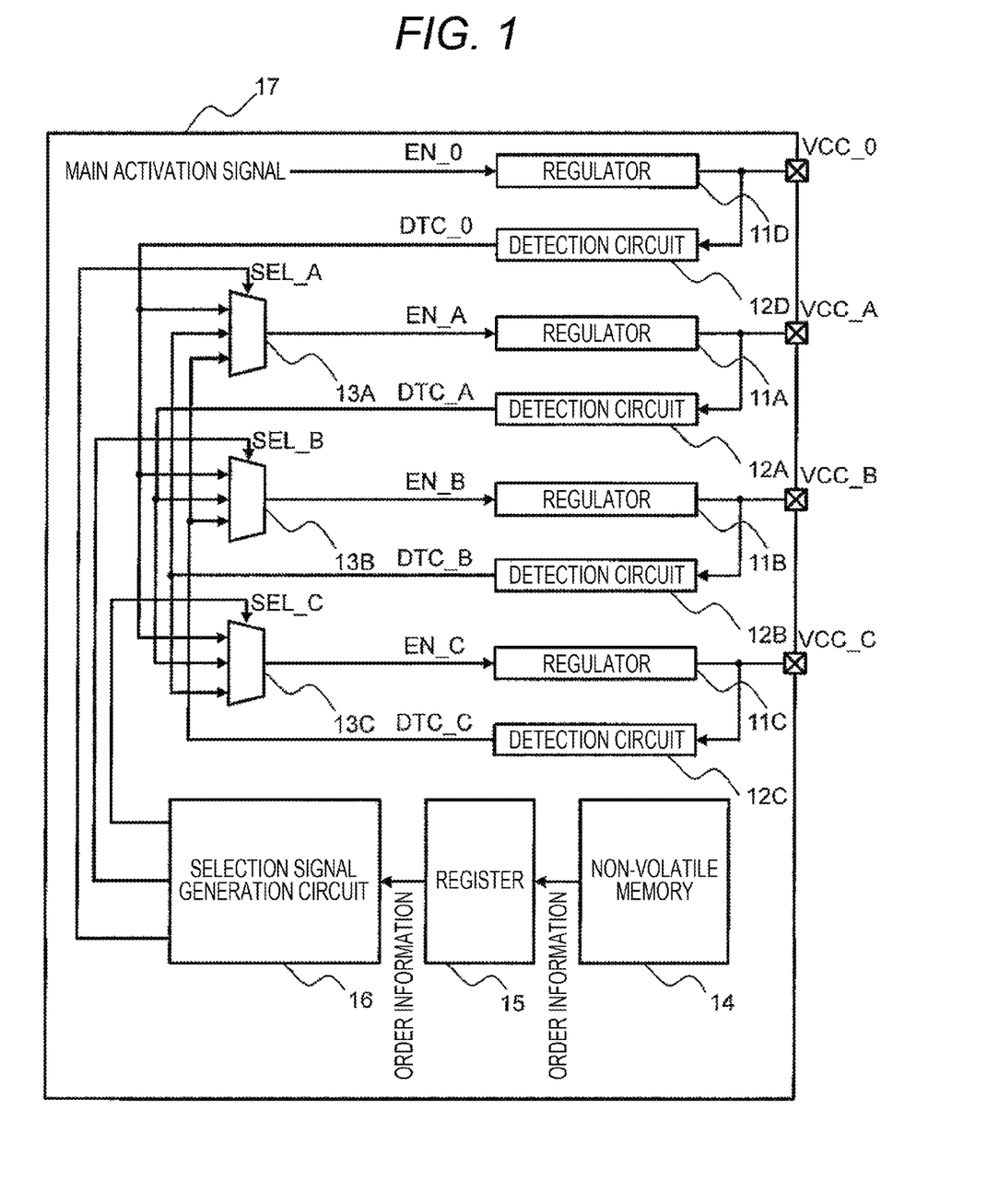
FIG. 1 is a configuration diagram of a power supply circuit 17 according to Embodiment 1.

FIG. 1 is a configuration diagram of a power supply circuit 17 according to Embodiment 1 of the present invention. The power supply circuit 17 includes regulators 11A to 11D. The regulators 11A to 11D are voltage regulating circuits outputting predetermined voltage (VCC_0 to VCC_C). The outputs are output to a device to which power is suppled located outside the power supply circuit 17 and are used as power for an external circuit such as a microcomputer.

The regulators 11A to 11D are activated by activation signals EN_A, EN_B, EN_C, and EN_0, respectively. In Embodiment 1, a main activation signal instructing start of a power supply sequence is input as the activation signal EN_0 activating the regulator 11D.

The regulators 11A to 11D are connected to detection circuits 12A to 12D, respectively. The detection circuits 12A to 12D monitor output voltage of the regulators 11A to 11D to detect operation states, respectively. When the output voltage values of the regulators 11A to 11D become equal to or higher than respective detection threshold values, the detection circuits 12A to 12D determine that the regulators 11A to 11D have been activated normally and output activation detection signals DTC_A, DTC_B, DTC_C, and DTC_0 so that each of the signals may be in a High level, respectively. The detection threshold values of the respective regulators may be equal to or different from each other.

Selectors 13A to 13C are selection circuits each selecting one of input signals in accordance with selection signals SEL_A to SEL_C and outputting the signal. The outputs of the selectors 13A to 13C are used as the activation signals EN_A to EN_C for the regulators 11A to 11C.

The selector 13A is provided with the activation detection signals DTC_0, DTC_B, and DTC_C. The selector 13B is provided with the activation detection signals DTC_0, DTC_A, and DTC_C. The selector 13C is provided with the activation detection signals DTC_0, DTC_A, and DTC_B. That is, each selector is provided with the activation detection signal DTC_0 in common and the activation detection signals for the regulators other than the regulator to which the selector itself outputs the activation signal.

A non-volatile memory 14 stores activation order data designating an activation order of the regulators 11A to 11C. When the power supply circuit 17 is activated, the activation order data is read on a register 15. A selection signal generation circuit 16 generates the selection signals SEL_A to SEL_C with reference to the activation order data held in the register 15.

The selection signal generation circuit 16 generates the selection signals SEL_A to SEL_C so that the activation detection signal for the previous regulator may be selected as the output of the selector in accordance with the activation order designated by the activation order data. For example, in a case in which the activation order is designated so that the regulator 11A may be activated subsequent to the regulator 11B, the selection signal generation circuit 16 generates the selection signal SEL_A so that the selector 13A may select the activation detection signal DTC_B. Accordingly, the selection signal generation circuit 16 can control the activation order of the regulators 11A to 11C via the selection signals SEL_A to SEL_C.

Also, since the activation detection signal for the previous regulator is used as the activation signal for the subsequent regulator, activation of the subsequent regulator can be started after the output voltage of the previous regulator has risen sufficiently. Accordingly, even in a case in which a load connected externally to the power supply circuit 17 is high, and in which it takes time to activate the regulator, or in a case in which the previous regulator is failed and is not activated, a wrong order in the power supply sequence can be prevented.

In Embodiment 1, the activation order data stored in the non-volatile memory 14 is only the activation order of the regulators 11A to 11C. Hence, in a case in which the three regulators 11A to 11C are activated in order, the power activation sequence has six patterns, and the required number of bits is 3 bits. Even in a case in which the plurality of regulators is activated at the same time, the power activation sequence has ten patterns, and the required number of bits is 4 bits. Accordingly, the memory capacity can be saved.

Figure 2:
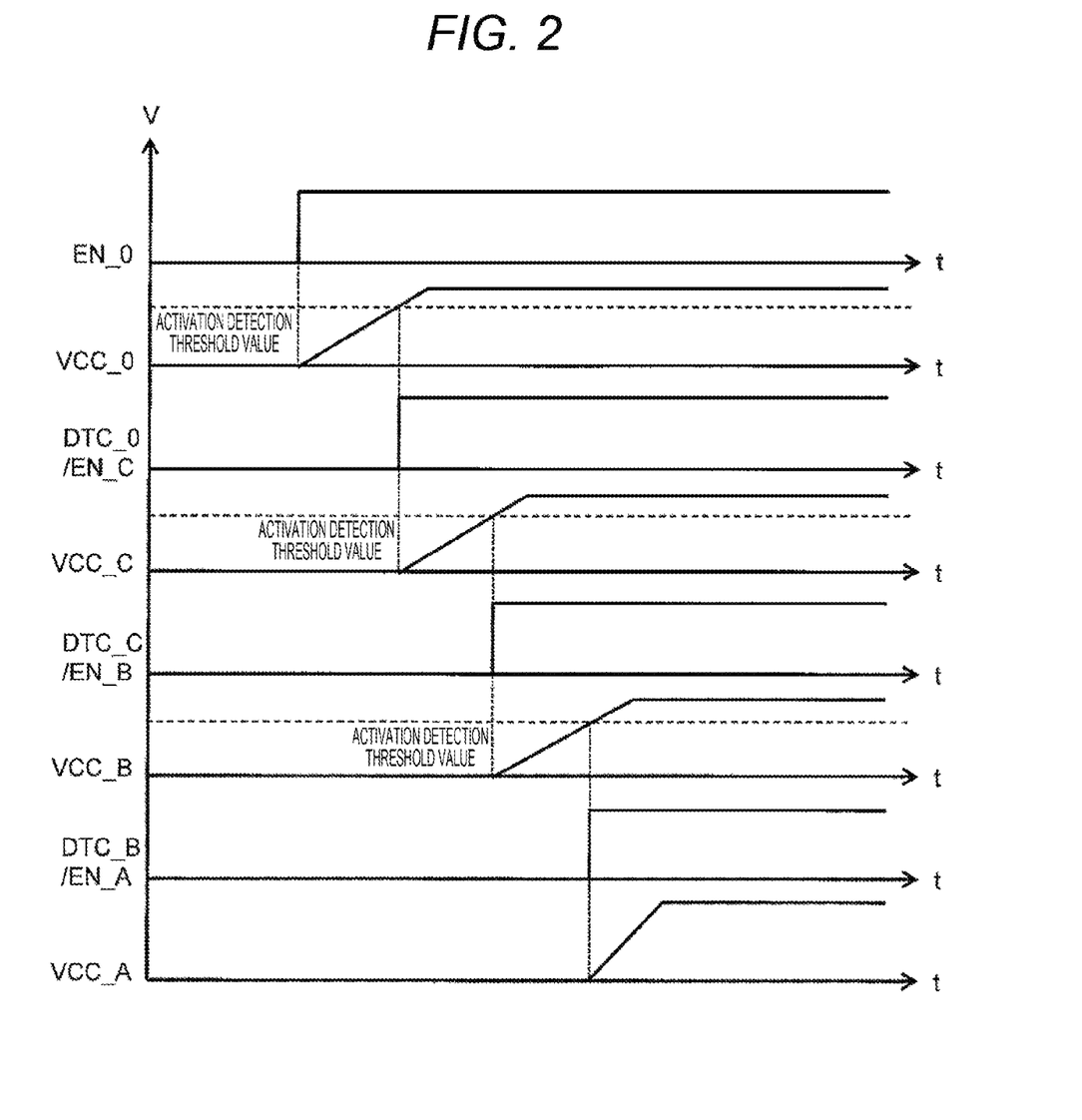
FIG. 2 is a timing chart illustrating temporal changes of respective signals in a case in which an activation order of regulators is regulators 11D, 11C, 11B, and 11A in Embodiment 1.

FIG. 2 is a timing chart illustrating temporal changes of respective signals in a case in which the activation order of the regulators is the regulators 11D, 11C, 11B, and 11A in Embodiment 1. That is, in this example, the selector 13A selects the activation detection signal DTC_B, the selector 13B selects the activation detection signal DTC_C, and the selector 13C selects the activation detection signal DTC_0.

When the main activation signal input as the activation signal EN_0 for the regulator 11D is High, the regulator 11D is activated, and the output voltage VCC_0 rises. When VCC_0 exceeds the activation detection threshold value of the detection circuit 12D, the activation detection signal DTC_0 is High. Since the selector 13C selects the activation detection signal DTC_0 and outputs the signal as the activation signal EN_C, the activation signal EN_C is High at the same time, the regulator 11C is activated, and the output voltage VCC_C rises.

When the output voltage VCC_C exceeds the activation detection threshold value of the detection circuit 12C, the activation detection signal DTC_C is High. Since the selector 13B selects the activation detection signal DTC_C, the activation signal EN_B is High at the same time. When the activation signal EN_B is high, the regulator 11B is activated. When the output voltage VCC_B exceeds the activation detection threshold value, the activation detection signal DTC_B is High. Since the selector 13A selects the activation detection signal DTC_B, the activation signal EN_A is High at the same time, and the regulator 11A is activated. In this manner, by arbitrarily setting the activation detection signals that the selectors 13A to 13C select, the activation order of the regulators can be varied.

In a configuration in which the activation order of the regulators is variable by time difference setting of the activation signals as in the conventional technique, time required for activation of the regulator changes depending on the state of the externally connected load, and the timing difference setting of activation of the regulators needs to be performed in expectation of a margin. Conversely, according to the present invention, since the subsequent regulator is activated in response to detection of activation of the previous regulator, no time margin is required to be expected, and a quicker power supply sequence can be executed.

Figure 3:
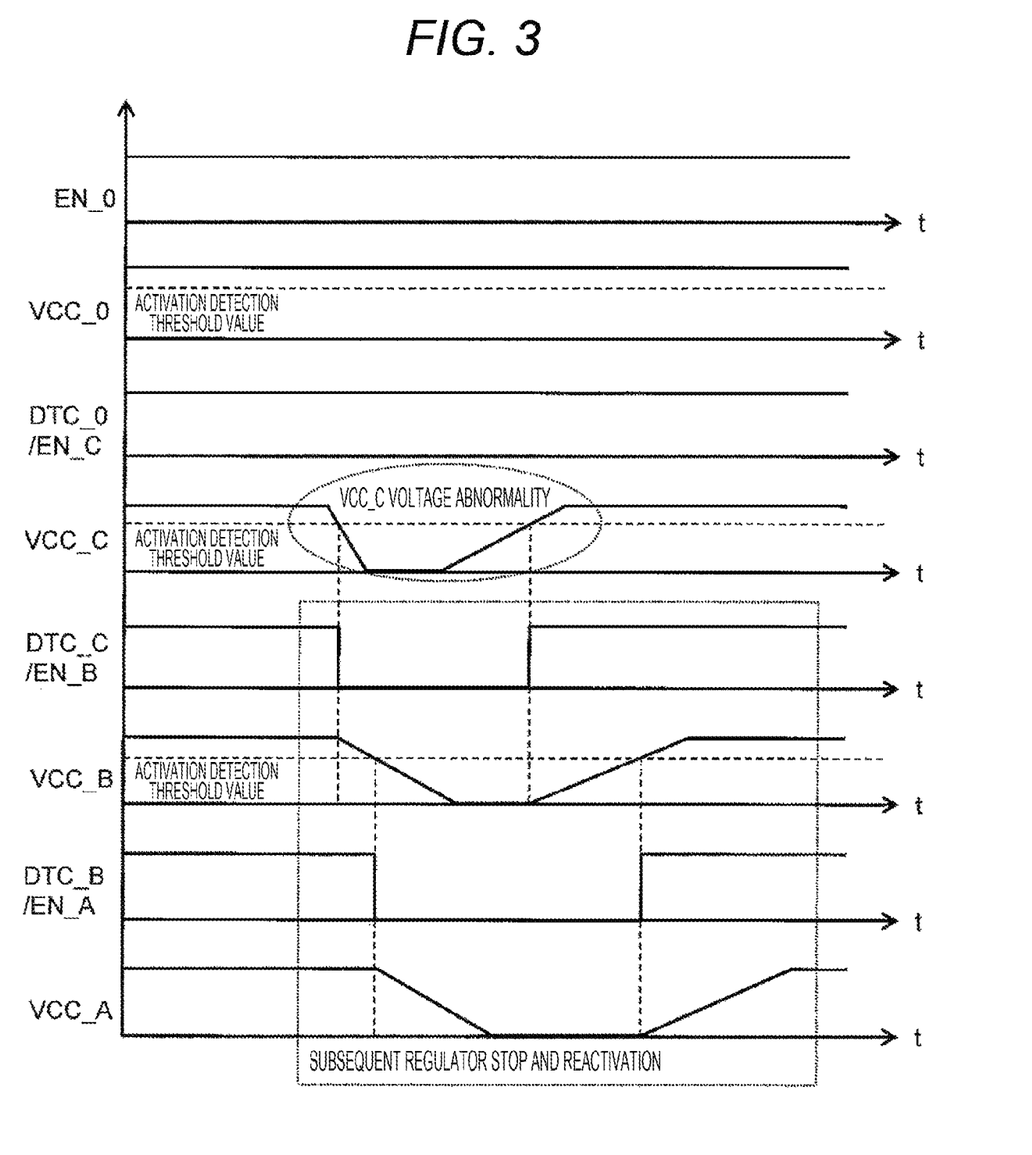
FIG. 3 is a timing chart of respective signals in a case in which the regulator 11C is failed, and in which output voltage VCC_C falls.

FIG. 3 is a timing chart of the respective signals in a case in which the regulator 11C is failed, and in which the output voltage VCC_C falls. The activation order shall be the same as that in FIG. 2. In a state in which all of the regulators 11A to 11D are operated, when the output voltage VCC_C falls due to a failure of the regulator 11C and falls below the activation detection threshold value of the detection circuit 12C, the activation detection signal DTC_C is Low, and the activation signal EN_B is Low at the same time. The regulator 11B thus stops. When the output voltage VCC_B falls below the activation detection threshold value of the detection circuit 12B, the activation detection signal DTC_B is Low, and the activation signal EN_A is Low at the same time. The regulator 11A thus stops, and the output voltage VCC_A falls.

Thereafter, when the regulator 11C comes to a normal state and is activated again, and the output voltage VCC_C exceeds the activation detection threshold value of the detection circuit 12C, the activation detection signal DTC_C and the activation signal EN_B are High, the regulator 11B is activated again, and the output voltage VCC_B rises. When the output voltage VCC_B exceeds the activation detection threshold value of the detection circuit 12B, the activation detection signal DTC_B and the activation signal EN_A are High. Hence, the regulator 11A is activated again, and the output voltage VCC_A rises. This brings about an original state in which all of the regulators 11A to 11D are activated and output normal voltage.

In this manner, the detection circuits 12A to 12D monitor the output voltage values of the regulators 11A to 11D, and the results are used as the activation signals for the subsequent regulators. Thus, when the output voltage of the previous regulator is abnormal, the subsequent regulator stops. Consequently, a wrong order in the power supply sequence can be prevented. Also, an abnormal power supply state that cannot occur in the set power supply sequence, such as a state in which the previous regulator stops while the subsequent regulator is supplying power, can be prevented.

Embodiment 1: Summary

As described above, since the power supply circuit 17 according to Embodiment 1 reliably controls an activation order of regulators, a malfunction of an external element such as a microcomputer connected to the power supply circuit 17 can be prevented. Also, in a case in which an abnormal regulator returns to a normal state, the subsequent regulator is immediately activated again based on a set power supply sequence, and the external element can resume the operation.

Embodiment 2

In Embodiment 1, an activation order and a stop order of the respective regulators are set by the same selection signals SEL_A to SEL_C. In Embodiment 2 according to the present invention, in addition to the configuration described in Embodiment 1, a configuration example in which the activation order and the stop order can be set separately will be described. Hence, activation order data in Embodiment 2 designates the stop order of the respective regulators as well. Further, a configuration in which the outputs of the respective detection circuits are delayed with arbitrary delay periods is optionally added. Since the other configuration is similar to that in Embodiment 1, different points will mainly be described below.

Figure 4:
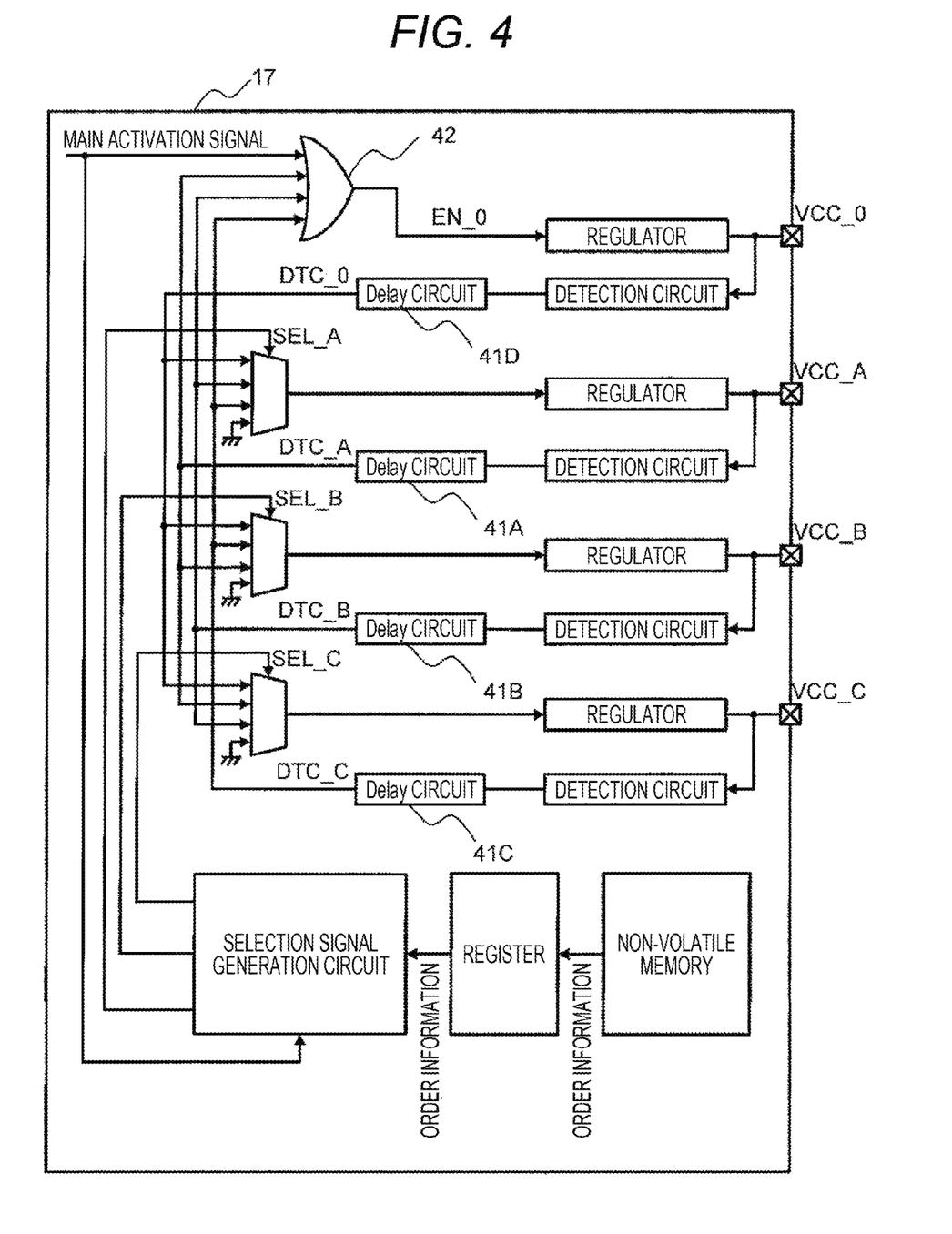
FIG. 4 is a configuration diagram of the power supply circuit 17 according to Embodiment 2.

FIG. 4 is a configuration diagram of the power supply circuit 17 according to Embodiment 2. Delay circuits 41A to 41D are connected to the detection circuits 12A to 12D, respectively. The outputs of the delay circuits 41A to 41C are input into the selectors 13A to 13C as the activation detection signals DTC_A, DTC_B, DTC_C, and DTC_0 in a similar manner to that in Embodiment 1.

An OR gate 42 receives as inputs the outputs DTC_A, DTC_B, and DTC_C of the delay circuits 41A to 41C and the main activation signal and outputs the activation signal EN_0 to the regulator 11D. When the OR gate 42 causes the main activation signal to be High in a state in which all of the regulators 11A to 11D stop, the regulator 11D is first activated, and an activation sequence of the subsequent regulators 11A to 11C is executed. In a case in which the main activation signal is Low, when all of the regulators 11A to 11C stop, the activation signal EN_0 is Low, and the regulator 11D stops lastly.

The selection signal generation circuit 16 receives as inputs the main activation signal as well as the activation order data. The selectors 13A to 13C respectively receive as inputs ground potentials as well as the activation detection signals. This will be described below.

The selection signal generation circuit 16 outputs signal values for an activation sequence of the regulators as the selection signals SEL_A to SEL_C when the main activation signal is High and outputs signal values for a stop sequence as the selection signals SEL_A to SEL_C when the main activation signal is Low. Specifically, (a) in the activation sequence, the respective selectors select the outputs in a similar manner to that in Embodiment 1, and (b) in the stop sequence, the selector corresponding to the regulator that is to stop first selects the ground potential, and the subsequent selectors select the activation detection signals corresponding to the regulators that are to stop subsequently. Accordingly, both the activation sequence and the stop sequence can be varied.

In a case in which the selectors 13A to 13C select the ground potentials, the destination regulators are in stop states. Thus, by selecting the ground potential as the activation signal for the regulator that is to stop first in the stop sequence, the stop sequence can be set separately from the activation sequence. Also, by selecting the ground potential as the activation signal at the time of execution of the activation sequence, the target regulator can be prevented from being activated. Accordingly, in a case in which the number of power supplies required in an outside of the power supply circuit 17 is low, the power consumption can be reduced.

Figure 5:
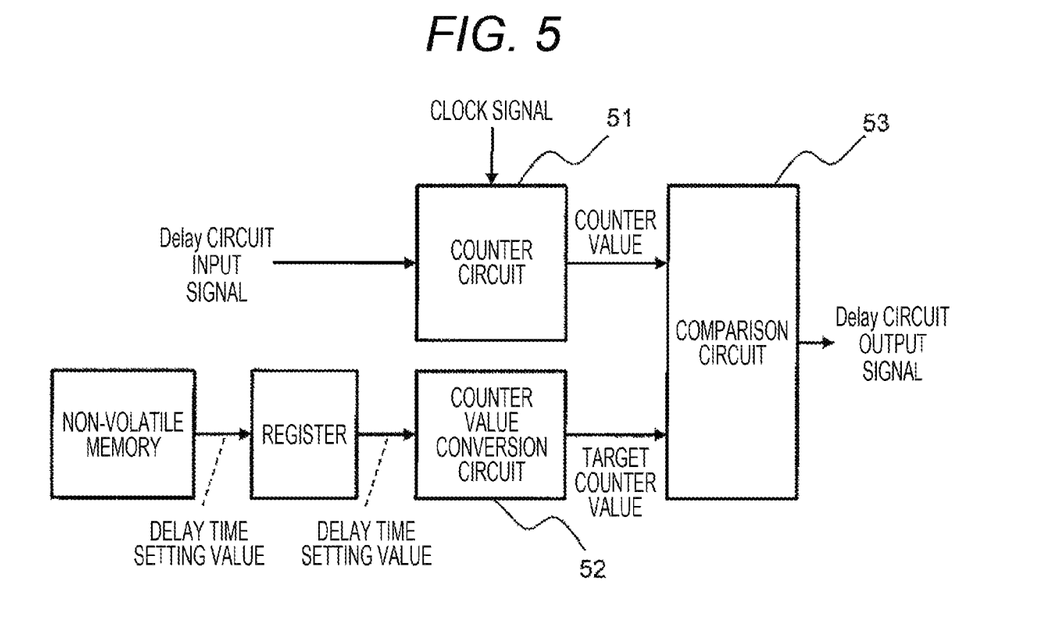
FIG. 5 is a configuration diagram of each of delay circuits 41A to 41D.

FIG. 5 is a configuration diagram of each of the delay circuits 41A to 41D. The delay circuits 41A to 41D have similar circuit configurations, and each includes a counter circuit 51, a counter value conversion circuit 52, and a comparison circuit 53.

The counter circuit 51 is operated by a delay circuit input signal and a clock signal serving as inputs of each of the delay circuits 41A to 41D and outputs a counter value to the comparison circuit 53. The counter circuit 51 clears a counter value at a rising edge and a falling edge of the delay circuit input signal and starts counting.

The counter value conversion circuit 52 reads a delay time setting value from the register 15, converts the value into a target counter value, and outputs the value to the comparison circuit 53. The delay time setting value is stored in the non-volatile memory 14 and is held in the register 15 at the time of activation of the power supply circuit 17. In a case in which the target counter value is stored in the non-volatile memory 14 as the delay time setting value, the counter value conversion circuit 52 can be dispensed with, and the delay time setting value is directly input from the register 15 into the comparison circuit 53.

The comparison circuit 53 compares the counter value, which is an output of the counter circuit 51, with the target counter value, which is an output of the counter value conversion circuit 52. When the counter value is the target counter value or higher, the comparison circuit 53 outputs an equal value to the delay circuit input signal as a delay circuit output signal.

Figure 6:
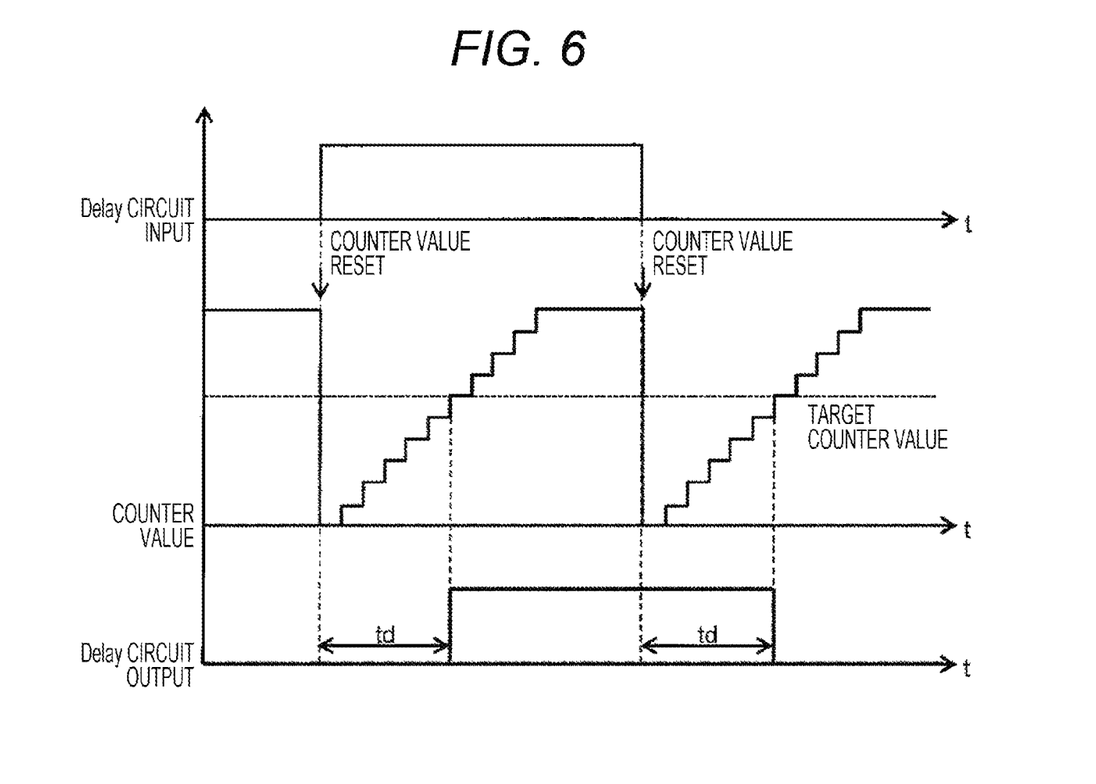
FIG. 6 is a timing chart illustrating an operation of each of the delay circuits 41A to 41D.

FIG. 6 is a timing chart illustrating the operation of each of the delay circuits 41A to 41D. When the counter circuit 51 receives the delay circuit input signal, the counter circuit 51 starts counting. When the counter value is the target counter value or higher, the delay circuit output signal is output. Delay time td (or a value obtained by converting the delay time into a counter value) from time when the counter circuit 51 receives the delay circuit input signal to time when the counter circuit 51 outputs the delay circuit output signal is stored in the non-volatile memory 14 or the register 15.

Figure 7:
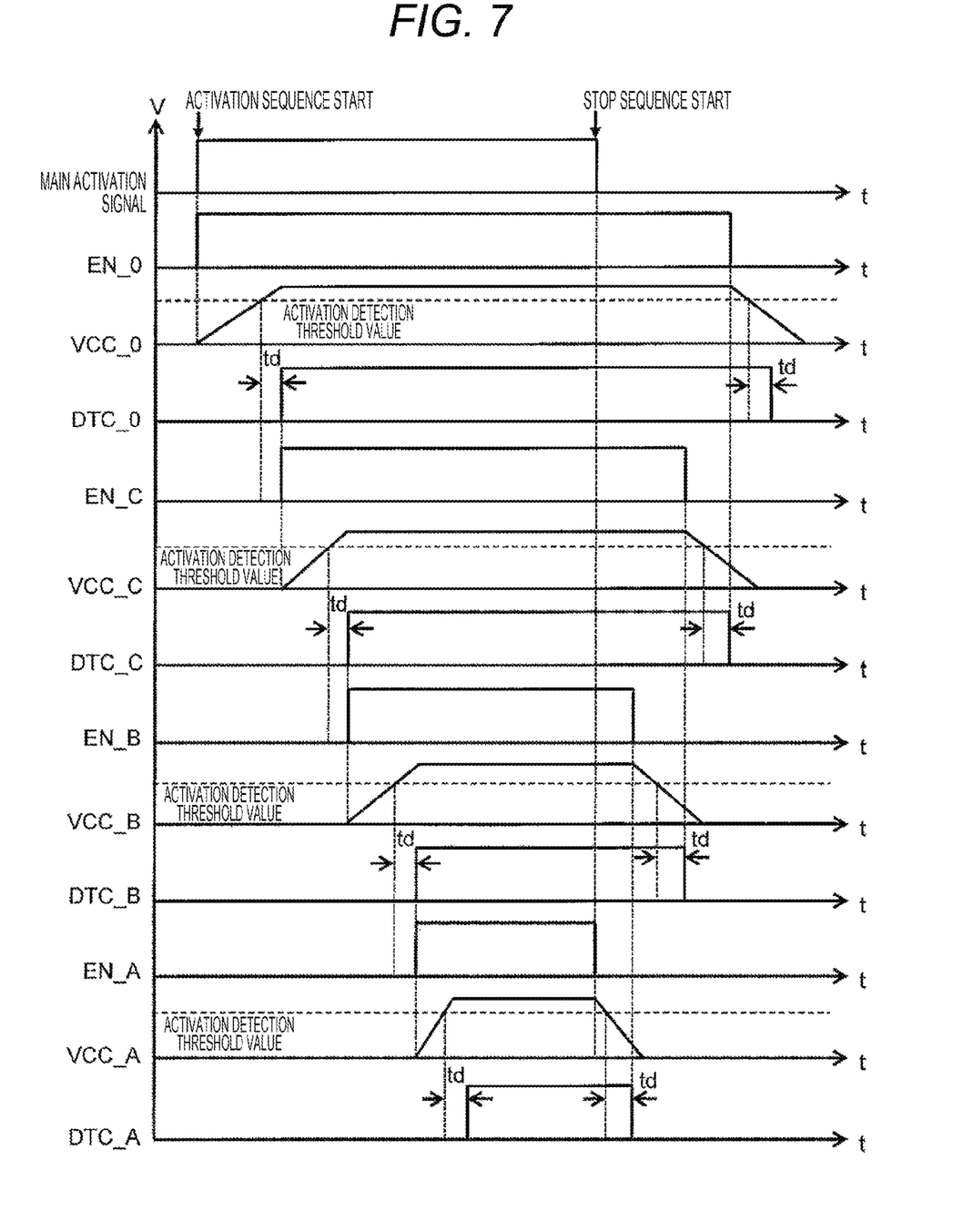
FIG. 7 is a timing chart illustrating temporal changes of respective signals in a case in which an activation order of the regulators is the regulators 11D, 11C, 11B, and 11A while a stop order is the regulators 11A, 11B, 11C, and 11D in Embodiment 2.

FIG. 7 is a timing chart illustrating temporal changes of respective signals in a case in which the activation order of the regulators is the regulators 11D, 11C, 11B, and 11A while the stop order is the regulators 11A, 11B, 11C, and 11D in Embodiment 2. The delay time of each of the delay circuits 41A to 41D is td. When the main activation signal is High (activation sequence), the selector 13A selects DTC_B, the selector 13B selects DTC_C, and the selector 13C selects DTC_0. When the main activation signal is Low (stop sequence), the selector 13A selects the ground potential, the selector 13B selects DTC_A, and the selector 13C selects DTC_B.

When the main activation signal is High, the selection signal generation circuit 16 outputs the selection signals SEL_A, SEL_B, and SEL_C for the activation sequence to the selectors 13A to 13C, respectively. At the same time as the main activation signal rises, the activation signal EN_0 is High, the regulator 11D is activated, and the output voltage VCC_0 rises. When VCC_0 exceeds the activation detection threshold value of the detection circuit 12D, the output of the detection circuit 12D is High, and DTC_0 is High after delay time td of delay via the delay circuit 41D. Since DTC_0 is output as the activation signal EN_C by the selector 13C, DTC_0 and EN_C are High at the same time, and the regulator 11C is activated. Subsequently, in a similar manner, DTC_C and EN_B are High after the delay time td has passed since the detection circuit 12C detects activation of the regulator 11C, the regulator 11B is activated, DTC_B and EN_A are High after the delay time td has passed since the detection circuit 12B detects activation of the regulator 11B, and the regulator 11A is activated.

When the main activation signal is Low, the selection signal generation circuit 16 outputs the selection signals SEL_A, SEL_B, and SEL_C for the stop sequence. The ground potential is selected as the activation signal EN_A for the regulator 11A that is to stop first, the EN_A is first Low, the regulator 11A stops, and the output voltage VCC_A falls. When VCC_A falls below the activation detection threshold value of the detection circuit 12A, the output of the detection circuit 12A is Low, and DTC_A is Low after the delay time td of delay via the delay circuit 41A. Since the selector 13B selects DTC_A and outputs DTC_A as EN_B, DTC_A and EN_B are Low at the same time, and the regulator 11B stops. When the output voltage VCC_B of the regulator 11B falls below the activation detection threshold value of the detection circuit 12B, DTC_B is Low after the delay time td of delay, and EN_C is Low at the same time by means of the selector 13C. In response to falling of EN_C, the regulator 11C stops, and DTC_C is Low after the delay time td has passed since VCC_C falls below the activation detection threshold value of the detection circuit 12C. As a result of the above, since all of the inputs in the OR gate 42 are Low, EN_0 is Low, the regulator 11D stops lastly, and the output voltage VCC_0 falls.

Embodiment 2: Summary

As described above, according to Embodiment 2, by adding the ground potentials as inputs of the selectors 13A to 13C and switching the selection signals of the selectors 13A to 13C depending on the main activation signal, both the activation sequence and the stop sequence can arbitrarily be set.

Further, with use of the delay circuits 41A to 41D, not only the activation order of the regulators 11A to 11D but also the activation timing can be varied. When td=0, the activation and stop sequences can be executed reliably and most quickly.

Embodiment 3

In the description of Embodiments 1 and 2, the selection signal generation circuit 16 generates the selection signals SEL_A to SEL_C. In Embodiment 3 according to the present invention, a configuration example will be described in which the activation order data held in the register 15 is used as a selection signal as it is, and in which the activation sequence and the stop sequence can be set separately. Since the other configuration is similar to those in Embodiments 1 and 2, different points will mainly be described below.

Figure 8:
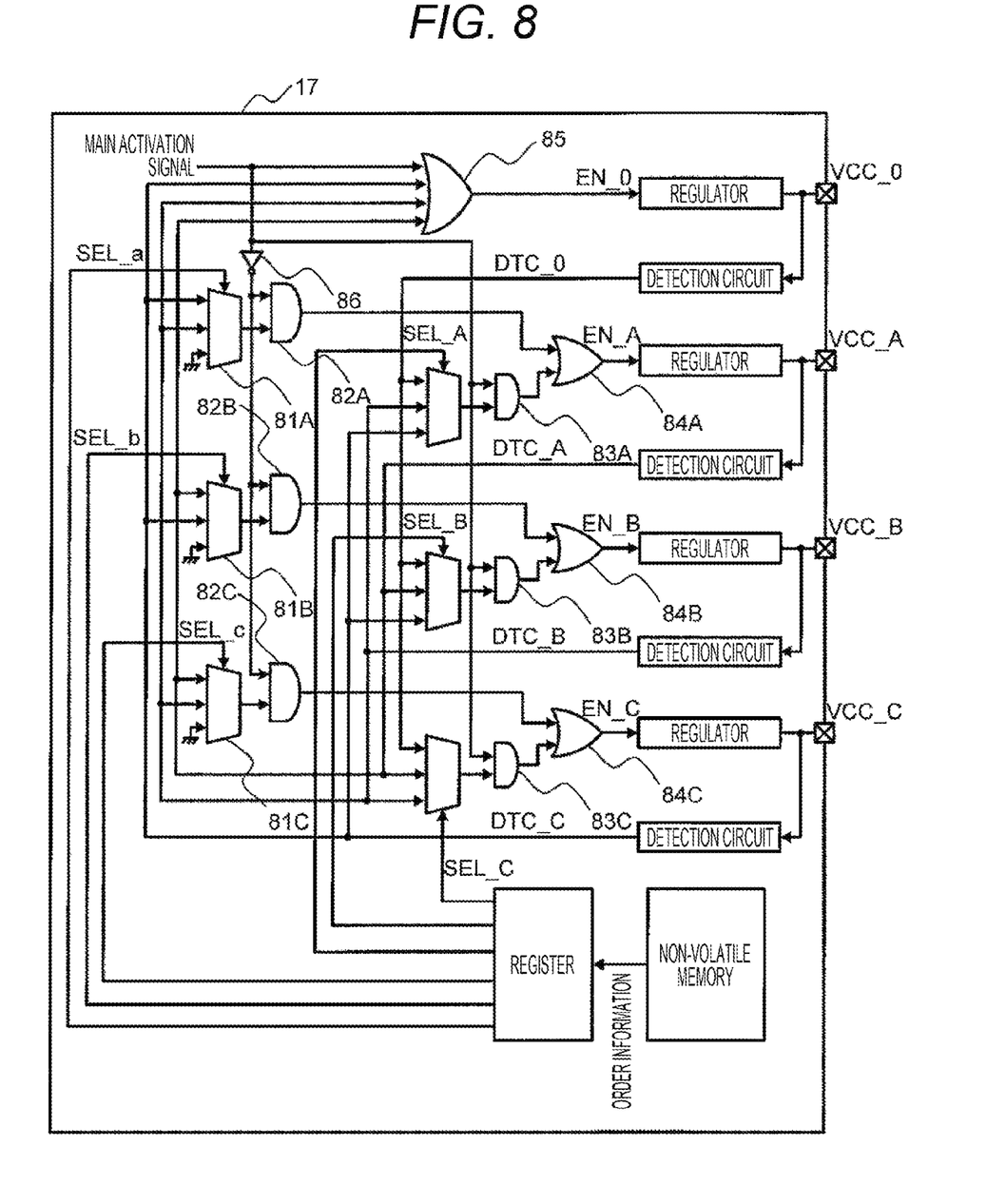
FIG. 8 is a configuration diagram of the power supply circuit 17 according to Embodiment 3.

FIG. 8 is a configuration diagram of the power supply circuit 17 according to Embodiment 3. Selectors 81A to 81C are selection circuits outputting activation signals in the stop sequence. AND gates 82A to 82C, AND gates 83A to 83C, OR gates 84A to 84C, an OR gate 85, and an inversion circuit 86 are logic circuits each determining an output of which of the selectors 13A to 13C and selectors 81A to 81C is used as one of the activation signals EN_A to EN_C in accordance with a value of the main activation signal.

Ground potentials are input into the selectors 81A to 81C, respectively. In addition, the activation detection signals DTC_B and DTC_C are input into the selector 81A, the activation detection signals DTC_A and DTC_C are input into the selector 81B, and the activation detection signals DTC_A and DTC_B are input into the selector 81C. Each of the selectors 81A to 81C selects and outputs one input in accordance with each of selection signals SEL_a to SEL_c.

The AND gates 82A to 82C are provided with respective outputs of the selectors 81A to 81C and the main activation signal inverted by the inversion circuit 86. Thus, the outputs of the AND gates 82A to 82C are equal to the output signals of the selectors 81A to 81C when the main activation signal is Low and are Low at all times when the main activation signal is High.

The AND gates 83A to 83C are provided with respective outputs of the selectors 13A to 13C and the main activation signal. Thus, the outputs of the AND gates 83A to 83C are equal to the output signals of the selectors 13A to 13C when the main activation signal is High and are Low at all times when the main activation signal is Low.

The OR gates 84A to 84C are provided with outputs of the AND gates 82A to 82C and outputs of the AND gates 83A to 83C. The outputs of the OR gates 84A to 84C are connected to the regulators 11A to 11C as the activation signals EN_A, EN_B, and EN_C, respectively.

When the main activation signal is High, the outputs of the AND gates 82A to 82C are Low at all times. Hence, the outputs of the AND gates 83A to 83C are equal to the outputs of the selectors 13A to 13C. Accordingly, the OR gates 84A to 84C output equal values to the outputs of the selectors 13A to 13C as the activation signals EN_A, EN_B, and EN_C to the regulators 11A to 11C, respectively. Similarly, when the main activation signal is Low, the OR gates 84A to 84C output equal values to the outputs of the selectors 81A to 81C as the activation signals EN_A, EN_B, and EN_C to the regulators 11A to 11C, respectively. In this manner, the selectors 13A to 13C are operated as selectors determining the order of the activation sequence while the selectors 81A to 81C are operated as selectors determining the order of the stop sequence.

In Embodiment 3, the selection signals of the respective selectors are directly stored as the activation order data in the non-volatile memory 14, and at the time of activation of the power supply circuit 17, the selection signals are read out from the non-volatile memory 14 and are held in the register 15. The respective selection signals SEL_A, SEL_B, and SEL_C of the selectors 13A to 13C and the respective selection signals SEL_a, SEL_b, and SEL_c of the selectors 81A to 81C are directly input from the register 15. Specifically, the potentials corresponding to the respective values held in the register may be used as the selection signals as they are.

Embodiment 3: Summary

As described above, in the power supply circuit 17 according to Embodiment 3, the activation sequence and the stop sequence can arbitrarily be set without the need to convert the activation order data into selection signals for the respective selectors.

Embodiment 4

Figure 9:
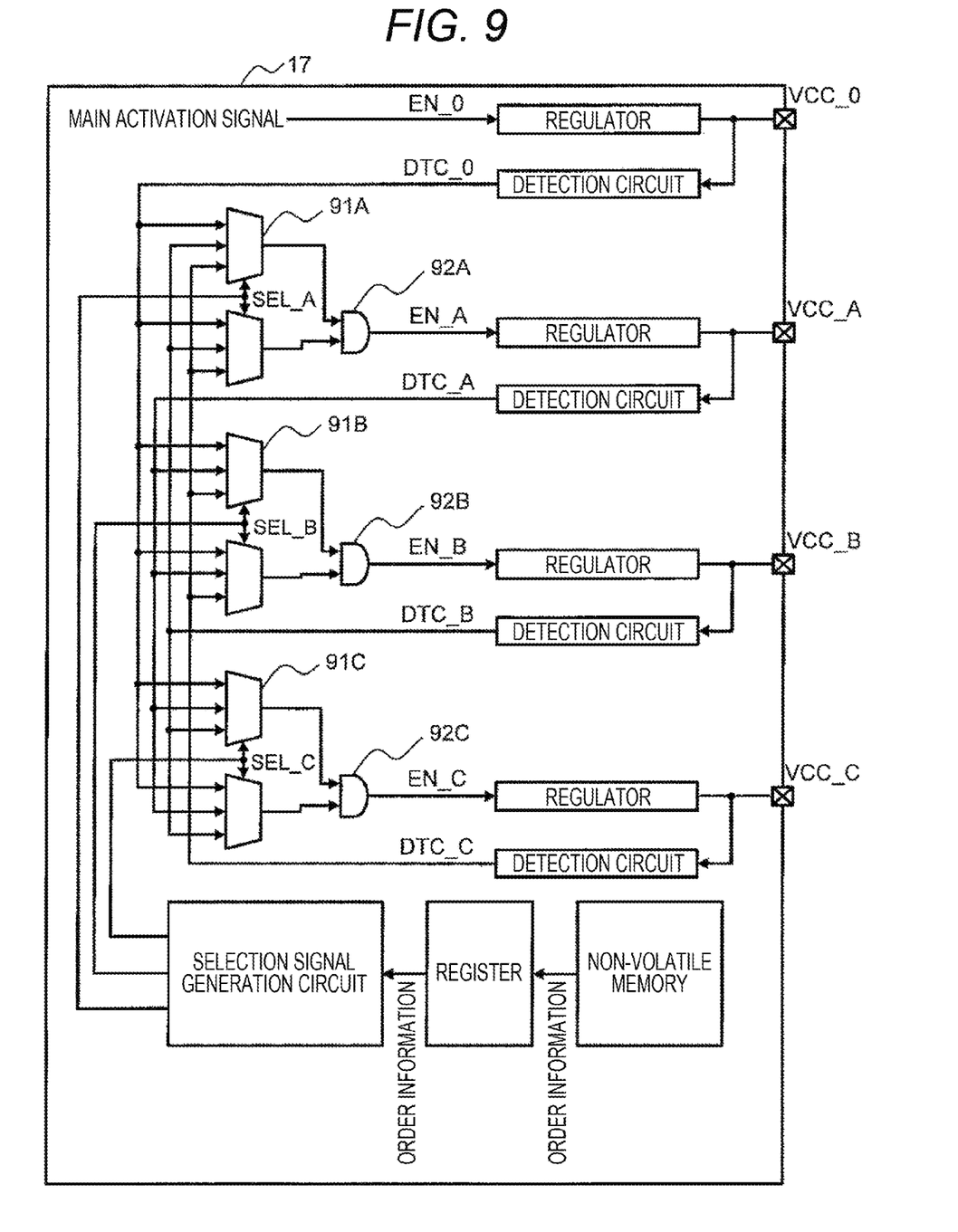
FIG. 9 is a configuration diagram of the power supply circuit 17 according to Embodiment 4.

FIG. 9 is a configuration diagram of the power supply circuit 17 according to Embodiment 4 of the present invention. The power supply circuit 17 according to Embodiment 4 includes selectors 91A to 91C and AND gates 92A to 92C in addition to the configuration described in Embodiment 1. Since the other configuration is similar to that in Embodiment 1, different points will mainly be described below.

Inputs and selection signals to the selectors 91A to 91C are equal to those to the selectors 13A to 13C. The AND gates 92A to 92C receive as inputs outputs of the selector 91A and the selector 13A, the selector 91B and the selector 13B, and the selector 91C and the selector 13C, derive logical products, and output results thereof as the activation signals EN_A, EN_B, and EN_C, respectively. Accordingly, only in a case in which both the outputs of the duplicated selectors are High, the activation signal to each of the regulators 11A to 11C is High. Consequently, an abnormal operation of the regulator in a case in which the output is kept High due to a failure or the like of the selector can be prevented.

Embodiment 5

Figure 10:
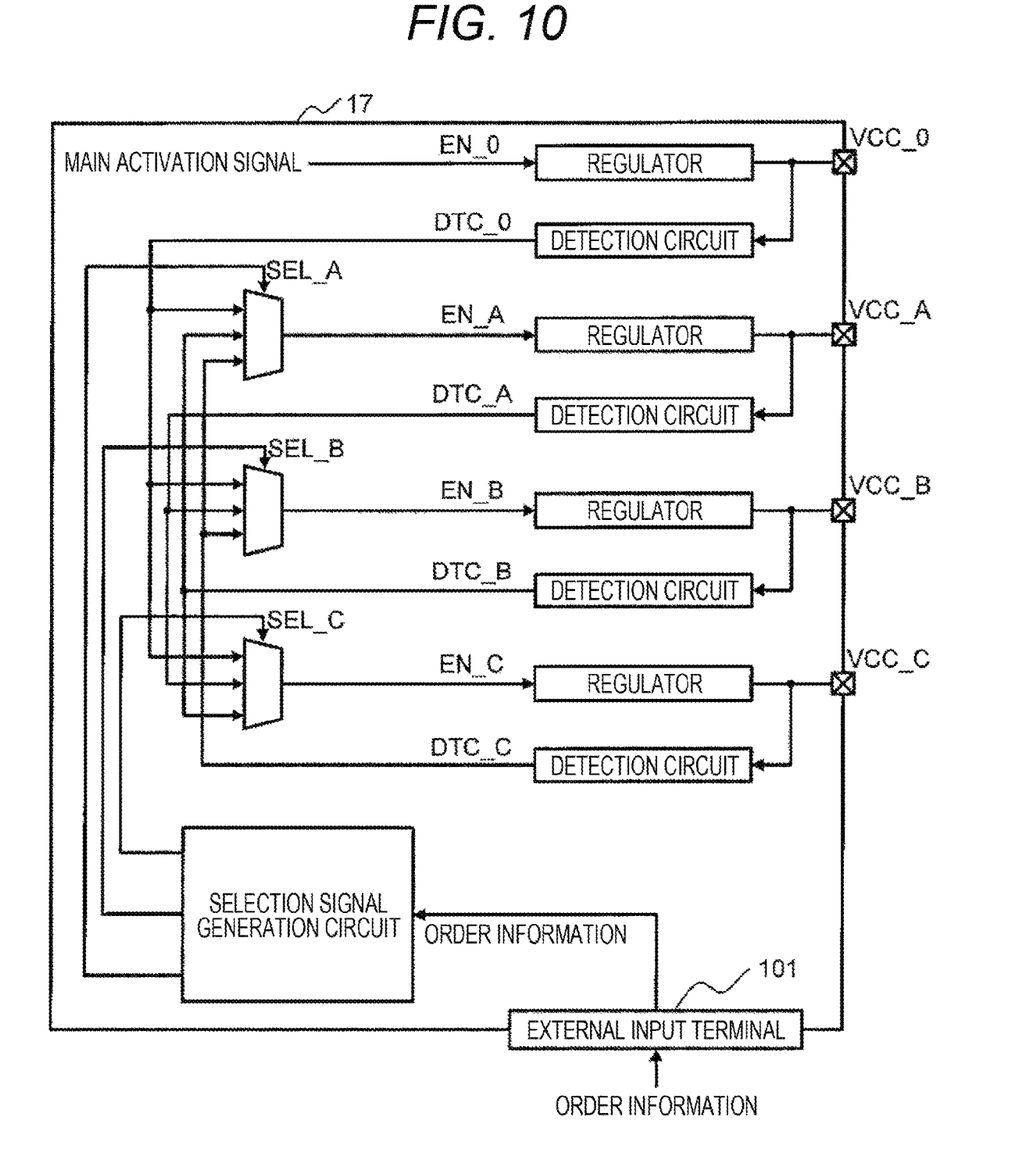
FIG. 10 is a configuration diagram of the power supply circuit 17 according to Embodiment 5.

FIG. 10 is a configuration diagram of the power supply circuit 17 according to Embodiment 5 of the present invention. The power supply circuit 17 according to Embodiment 5 includes an external input terminal 101 instead of the non-volatile memory 14 and the register 15 in Embodiment 1. Since the other configuration is similar to that in Embodiment 1, different points will mainly be described below.

The external input terminal 101 receives data designating an activation order of the respective regulators from an outside of the power supply circuit 17 and outputs the data to the selection signal generation circuit 16. Thus, since the activation order data does not need to be stored in the non-volatile memory 14 in advance, the user can freely set the power supply sequence. Also, the user can change the power supply sequence depending on the situation.

The signal that the external input terminal 101 receives may be the activation order data itself or an electric signal representing the equivalent content. In either case, the selection signal generation circuit 16 outputs a selection signal designated by the signal.

About Modification Examples of Present Invention

The present invention is not limited to the foregoing embodiments and includes various modification examples. For example, the foregoing embodiments have been described in detail to facilitate understanding of the present invention, and the present invention is not limited to one including all of the components described herein. Also, some components of one embodiment can be substituted with components of another embodiment, and components of another embodiment can be added to components of one embodiment. Further, some components of each embodiment can be added, deleted, and substituted with other components.

For example, the duplicated configuration described in Embodiment 4 can be employed in the other embodiments. Specifically, at least one of the respective selectors may be duplicated, and a circuit deriving a logical product of outputs of the duplicated selectors may be provided. Also, the external input terminal 101 described in Embodiment 5 can be provided in the other embodiments, and a selection signal can be generated with use of a signal received in the external input terminal 101.

In the description of the above embodiments, the main activation signal is input as the activation signal EN_0 for the regulator 11D, and the detection circuit 12D detects an operation state of the regulator 11D. Alternatively, the main activation signal itself may be used as an input into each of the selection circuits. In either case, each of the respective circuits uses as an input a result of detecting that the main activation signal has been input.

In the description of the above embodiments, although the ground potential is used as an input into the selector, the input does not necessarily have to be the ground potential as long as the input is a potential instructing stop of the regulator.

REFERENCE SIGNS LIST 11A to 11D regulator
12A to 12D detection circuit
13A to 13C selector
14 non-volatile memory
15 register
16 selection signal generation circuit
17 power supply circuit
41A to 41D delay circuit
81A to 81C selector
82A to 82C AND gate
83A to 83C AND gate
84A to 84C OR gate
85 OR gate
86 inversion circuit
91A to 91C selector
92A to 92C AND gate
101 external input terminal

The invention claimed is:
1. A power supply circuit comprising:
first and second voltage regulators;
a first detection circuit detecting an operation state of the first voltage regulator;
a second detection circuit detecting an operation state of the second voltage regulator; and
a control circuit controlling an operation order of the first and second voltage regulators in accordance with detection results provided by the first and second detection circuits,
wherein, in accordance with a selection signal designating the operation order of the first and second voltage regulators, after one of the first and second voltage regulators rises, the control circuit causes the other to rise, or after one of the first and second voltage regulators falls, the control circuit causes the other to fall.
2. The power supply circuit according to claim 1, wherein the control circuit further includes:

a first selection circuit selecting the detection result provided by the second detection circuit or a detection result of detecting that a main activation signal instructing the power supply circuit to be activated or stopped has been inputted and outputting a selection result as a first activation signal causing the first voltage regulator to be activated or stopped; and a second selection circuit selecting the detection result provided by the first detection circuit or the detection result of detecting that the main activation signal has been inputted and outputting a selection result as a second activation signal causing the second voltage regulator to be activated or stopped, wherein the first selection circuit selects the detection result of detecting that the main activation signal has been inputted in a case in which the selection signal designates causing the second voltage regulator to rise after causing the first voltage regulator to rise and selects the detection result provided by the second detection circuit in a case in which the selection signal designates causing the first voltage regulator to rise after causing the second voltage regulator to rise, and wherein the second selection circuit selects the detection result of detecting that the main activation signal has been inputted in a case in which the selection signal designates causing the first voltage regulator to rise after causing the second voltage regulator to rise and selects the detection result provided by the first detection circuit in a case in which the selection signal designates causing the second voltage regulator to rise after causing the first voltage regulator to rise.

3. The power supply circuit according to claim 2, wherein the first selection circuit selects and outputs as the first activation signal one of the detection result provided by the second detection circuit, the detection result of detecting that the main activation signal has been inputted, and a first stop potential designating stop of the first voltage regulator, wherein the second selection circuit selects and outputs as the second activation signal one of the detection result provided by the first detection circuit, the detection result of detecting that the main activation signal has been inputted, and a second stop potential designating stop of the second voltage regulator, wherein the first selection circuit selects the first stop potential in a case in which the selection signal designates causing the second voltage regulator to fall after causing the first voltage regulator to fall and in which the main activation signal instructing the power supply circuit to stop is inputted and selects the detection result provided by the second detection circuit in a case in which the selection signal designates causing the first voltage regulator to fall after causing the second voltage regulator to fall and in which the main activation signal instructing the power supply circuit to stop is inputted, and wherein the second selection circuit selects the second stop potential in a case in which the selection signal designates causing the first voltage regulator to fall after causing the second voltage regulator to fall and in which the main activation signal instructing the power supply circuit to stop is inputted and selects the detection result provided by the first detection circuit in a case in which the selection signal designates causing the second voltage regulator to fall after causing the first voltage regulator to fall and in which the main activation signal instructing the power supply circuit to stop is inputted.

4. The power supply circuit according to claim 2, wherein the control circuit further includes at least one of:

a first delay circuit delaying time to output the detection result provided by the second detection circuit to the first selection circuit; and a second delay circuit delaying time to output the detection result provided by the first detection circuit to the second selection circuit.

5. The power supply circuit according to claim 2, wherein the control circuit further includes:

a third selection circuit selecting and outputting one of the detection result provided by the second detection circuit and a first stop potential designating stop of the first voltage regulator;

a fourth selection circuit selecting and outputting one of the detection result provided by the first detection circuit and a second stop potential designating stop of the second voltage regulator; and a logic circuit outputting outputs from the first and second selection circuits as the first and second activation signals, respectively, in a case in which the main activation signal instructing the power supply circuit to be activated is inputted and outputting outputs from the third and fourth selection circuits as the first and second activation signals, respectively, in a case in which the main activation signal instructing the power supply circuit to stop is inputted.

6. The power supply circuit according to claim 5, wherein the power supply circuit includes a storage element storing a bit value representing an operation order designated by the selection signal, and wherein each of the first, second, third, and fourth selection circuits acquires the bit value stored in the storage element as a selection input and selects an output in accordance with the selection input.

7. The power supply circuit according to claim 1, wherein, when an output voltage of the first voltage regulator falls below a first threshold value, the first detection circuit outputs a detection result of detecting that the first voltage regulator has fallen, and wherein, when an output voltage of the second voltage regulator falls below a second threshold value, the second detection circuit outputs a detection result of detecting that the second voltage regulator has fallen.

8. The power supply circuit according to claim 1, wherein, when an output voltage of the first voltage regulator becomes equal to or higher than a first threshold value, the first detection circuit outputs a detection result of detecting that the first voltage regulator has risen, and wherein, when an output voltage of the second voltage regulator becomes equal to or higher than a second threshold value, the second detection circuit outputs a detection result of detecting that the second voltage regulator has risen.

9. The power supply circuit according to claim 1, wherein the control circuit outputs a first activation signal causing the first voltage regulator to be activated or stopped and a second activation signal causing the second voltage regulator to be activated or stopped, and wherein the power supply circuit further includes:

a second control circuit having an equal configuration to that of the control circuit;

a first logic circuit outputting to the first voltage regulator a logic product between the first activation signal output by the control circuit and the first activation signal output by the second control circuit; and
a second logic circuit outputting to the second voltage regulator a logic product between the second activation signal output by the control circuit and the second activation signal output by the second control circuit.

10. The power supply circuit according to claim 1, further comprising an input terminal receiving an external input designating the selection signal.

* * * * *